United States Patent
McCoy

(10) Patent No.: US 7,817,027 B2
(45) Date of Patent: Oct. 19, 2010

(54) METHOD AND SYSTEM FOR INTEGRATED MEDIA AND VEHICLE SEAT BELT MONITORING

(75) Inventor: Robert W. McCoy, Ann Arbor, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 257 days.

(21) Appl. No.: 11/940,022

(22) Filed: Nov. 14, 2007

(65) Prior Publication Data

US 2009/0121859 A1 May 14, 2009

(51) Int. Cl.
B60Q 1/00 (2006.01)
(52) U.S. Cl. .................. 340/457.1; 180/268; 180/269; 180/270
(58) Field of Classification Search ............ 340/457.1; 180/268–270
See application file for complete search history.

(56) References Cited

U.S. PATENT DOCUMENTS

| | | | | | |
|---|---|---|---|---|---|
| 4,673,195 | A | * | 6/1987 | Boyd et al. ............ | 280/801.1 |
| 4,727,358 | A | * | 2/1988 | Burt, III .................. | 340/384.1 |
| 4,727,538 | A | * | 2/1988 | Furchtgott et al. ......... | 370/431 |
| 4,758,020 | A | * | 7/1988 | Boyd ...................... | 280/801.1 |
| 5,739,746 | A | * | 4/1998 | Shaffer et al. ............ | 340/425.5 |
| 6,215,395 | B1 | | 4/2001 | Slaughter et al. | |
| 6,278,358 | B1 | | 8/2001 | Spoto et al. | |
| 6,339,371 | B1 | * | 1/2002 | Baggelaar et al. ........ | 340/457.1 |
| 6,501,374 | B1 | | 12/2002 | King et al. | |
| 6,750,764 | B1 | * | 6/2004 | Henninger ............... | 340/457.1 |
| 6,806,810 | B2 | | 10/2004 | Robinson | |
| 6,992,571 | B2 | | 1/2006 | Ota et al. | |
| 7,106,005 | B2 | | 9/2006 | Tsuchiya et al. | |
| 7,145,448 | B2 | | 12/2006 | Tanaka et al. | |
| 7,173,522 | B2 | | 2/2007 | Inoue et al. | |
| 7,511,610 | B2 | * | 3/2009 | Downey et al. .......... | 340/457.1 |
| 7,554,446 | B2 | * | 6/2009 | Ciarcia et al. ............ | 340/568.1 |
| 2004/0124974 | A1 | * | 7/2004 | Ota et al. .................. | 340/457.1 |
| 2005/0012606 | A1 | * | 1/2005 | Lee ........................ | 340/457.1 |
| 2005/0046561 | A1 | | 3/2005 | Inoue | |
| 2006/0273917 | A1 | | 12/2006 | Rams | |
| 2009/0009313 | A1 | * | 1/2009 | Pippins, Sr. ............... | 340/457.1 |
| 2009/0027188 | A1 | * | 1/2009 | Saban ........................ | 340/521 |
| 2009/0088928 | A1 | * | 4/2009 | Schroeder et al. ............. | 701/45 |

* cited by examiner

*Primary Examiner*—Benjamin C Lee
*Assistant Examiner*—Quang Pham
(74) *Attorney, Agent, or Firm*—Franklin MacKenzie; Ford Global Technologies, LLC

(57) ABSTRACT

The present invention is, in one embodiment, directed to a system and method to encourage seat belt use among all passengers in a vehicle. The system and method use media driver and entertainment devices to reward seat belt usage in all seating positions.

11 Claims, 3 Drawing Sheets

METHOD AND SYSTEM FOR INTEGRATED MEDIA AND VEHICLE SEAT BELT MONITORING

TECHNICAL FIELD OF THE INVENTION

Seat belt use has been shown by numerous studies as an effective means to reduce the potential for injury in vehicle crashes. Currently, the rate of seatbelt usage in automobiles is at an all time high. Much of this rise in use has been attributed to increased awareness of the safety benefits of seat belts use and the implementation of technology designed to remind or prompt drivers and front seat passengers to buckle their seatbelts. However, seat belt prompts and reminders have thus far been limited to first row seating positions in automobiles. A recent study indicated that no manufacture has implemented a seat belt prompting system for either second or third row seating positions. A technology that is able to encourage and increase the use of seatbelt systems for all seating positions is desirable, with an emphasis on encouraging passengers in seating positions not currently addressed by common systems. A system capable of encouraging seat belt use and providing audio, video and gaining entertainment to rear seat occupants in automobiles is desirable as a cost effective means to encourage seat belt demand.

For any seatbelt reminder system to be successful, it must effectively influence the behavior of the occupants in the seating positions that it is monitoring. It must encourage all occupants to be belted and remain belted while the vehicle is moving. Currently, there are a number of seat belt reminder systems on vehicles. Virtually, all of these systems are designed to encourage the driver and in some cases the first row passenger to buckle their seat belts and remain belted while the vehicle is moving. A typical seat belt reminder system utilizes a sensor to sense when there is an occupant present in the seat and whether the corresponding seat belt is buckled. Many systems will play a series of chimes at different time intervals and may display an image on the dashboard to the vehicle operator when either the driver or first row passenger's seat belt is not buckled. Since their introduction, these types of systems, along with a greater enforcement of seat belt laws, have been shown to be effective in encouraging seat belt use. However, a seat belt reminder system designed specifically for first row seating positions may not be the most effective way of encouraging and increasing seat belt use for passengers in second or third row seating positions.

Passengers seated in the rear rows of vehicles are often entirely different demographic compared to first row occupants. They may be school age children, teens, pre-school, young adults, etc., and many vehicles are now equipped with audio and video entertainment systems designed specifically for rear row occupants.

Virtually, all pervious solutions have directed that the status messages (belted/unbelted) applies to only the vehicle operator via conventional methods such as dashboard display images and chimes. Therefore, these solutions provide feedback directed toward an individual (the vehicle operator) who, while driving, may not be able to buckle the unbuckled rear row occupants, and may divert their attention away from the task of safely operating the vehicle to that of a rear occupant who has become unbuckled and refuses to buckle. Additionally, many vehicles have rear seat entertainment systems provided with headphones that could block any auditory signal provided by the systems or vocal commands from the operator. Hence, a system that is able to direct visual and auditory feedback via an entertainment system to the rear seat occupants and to the first row occupants through digital media is desirable. The growing portability of digital media and the greater number of vehicles equipped with media players allows for the system to be easily customized for specific populations and age groups.

SUMMARY OF THE INVENTION

In one aspect, the present invention is a method for monitoring seats and associated seat belt use in a vehicle with an integrated media device associated with said seats. The method comprises the steps of determining whether the vehicle is activated initializing the integrated media for each seat to determine a status of each seat displaying the status of each seat to an operator of the vehicle, determining whether the vehicle is exceeding a predetermined threshold speed dynamically monitoring each seat position to determine any changes in status of each seat and associated seat belt and enabling play of an integrated media device associated with a seat only when said seat and said seat belt are in a synchronized state. A synchronized state occurs when said seat is occupied and said associated seat belt status changes from unbuckled to buckled, or when a seat is unoccupied and said associated seat belt is unbuckled.

The method may further include disabling control of the associated integrated media device when the seat is occupied and the associated seat belt status changes from buckled to unbuckled. In addition, the method may include updating a driver information console as the status of the seat and associated seat belt changes. Such updates may include visual alerts and audio alerts, or both.

In another embodiment, the present invention is a seat and associated seat belt monitoring system for a vehicle with an integrated media device associated with each seat. The system comprises an integrated seat, seat belt and media controller with a memory at least one sensor electronically connected to the integrated seat, seat belt and media controller to communicate data signals indicative of vehicle activation, vehicle speed, vehicle seat occupancy and associated seat belt status; a driver display electronically connected to the integrated seat, seat belt and media controller to receive data from the controller to permit audio or visual alerts to be made indicative of the status of the seats and associated seat belts and passenger integrated media devices associated with the seats and controlled by the seat, seat belt and media controller for passenger use when the seat and associated seat belt are in a synchronized state. The synchronized state may occur when the seat is occupied and the associated seat belt status changes from unbuckled to buckled or when a seat is unoccupied and the associated seat belt is unbuckled. Finally, the system may further include media and file interfaces adapted for use by passengers when the seat and associated seat belt are in a synchronized state.

DETAILED DESCRIPTION OF THE PREFERRED EMBODIMENT(S)

Figure 1:
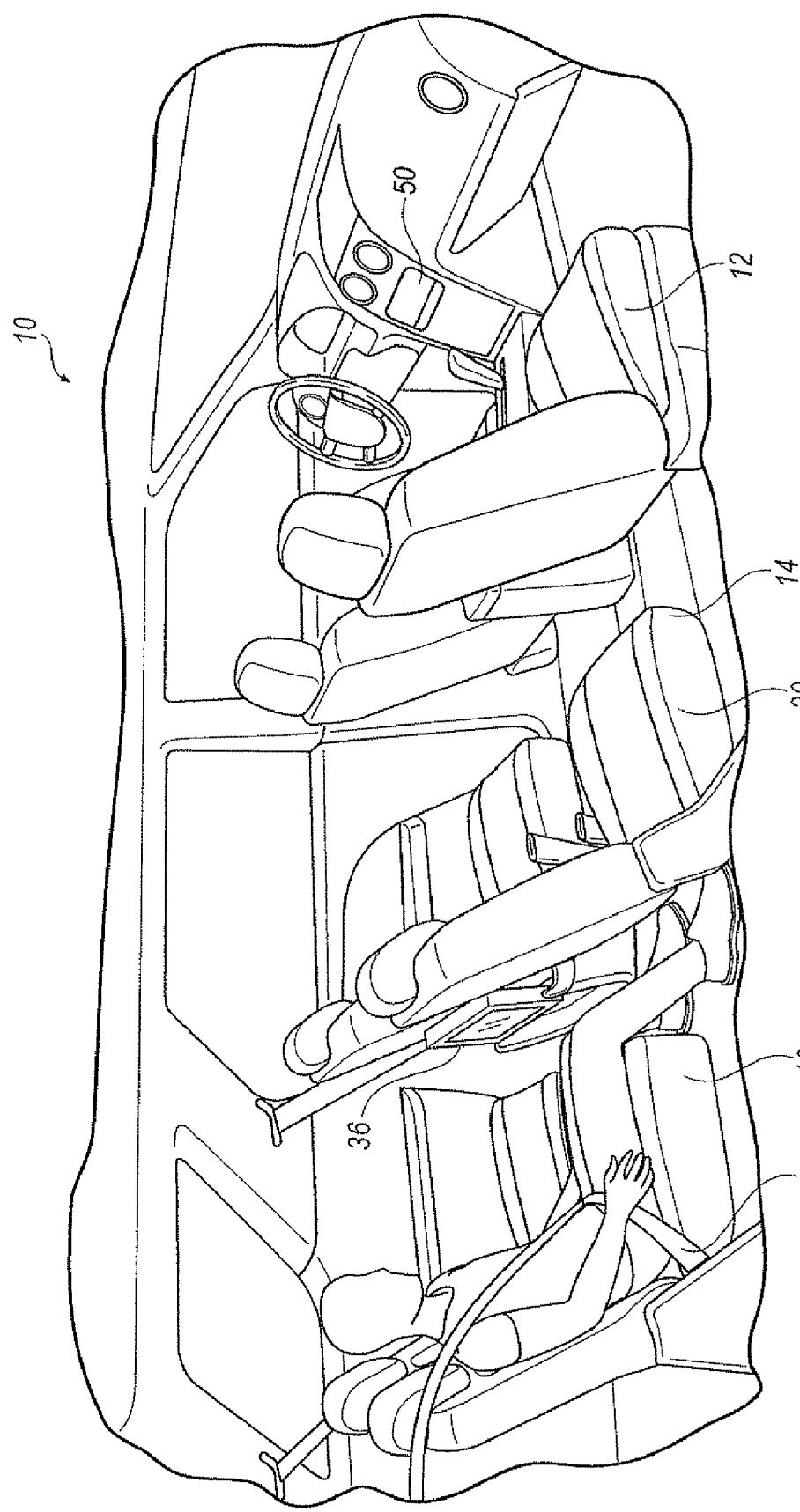
FIG. 1 is a schematic representation of a vehicle equipped with a driver console, seats, associated seat belts and integrated media system.

Turning now to the drawings wherein like numbers refer to like structures, FIG. 1 is a schematic representation of a vehicle 10 with seats 12, 14 and 16, depicted as captain's seats for convenience, but may be of any configuration. Each seat has associated therewith seat belts 18, disposed about said seats in a conventional manner so that at least two individuals may be accommodated per row 20 of seats. In the alternative, each of the bench seats 12 and 14 may be "captain's chair" type seats, with the third row seats 16 may be a bench type seat.

Regardless of the type of seat, each seat or each row of seats or any combination thereof is equipped with an associated, integrated media system 36, which may be a DVD player, video player, radio, iPod device, computer console or any other media device that may be desired by a consumer as equipment in a vehicle. Each of the media devices is operable and controllable by the occupants in the associated seats or seat rows. A driver display console 50 is located within the view of an operator of the vehicle to alert the operator of the status of the seats and seat belts in the vehicle in a manner to be hereinafter described.

Figure 2:
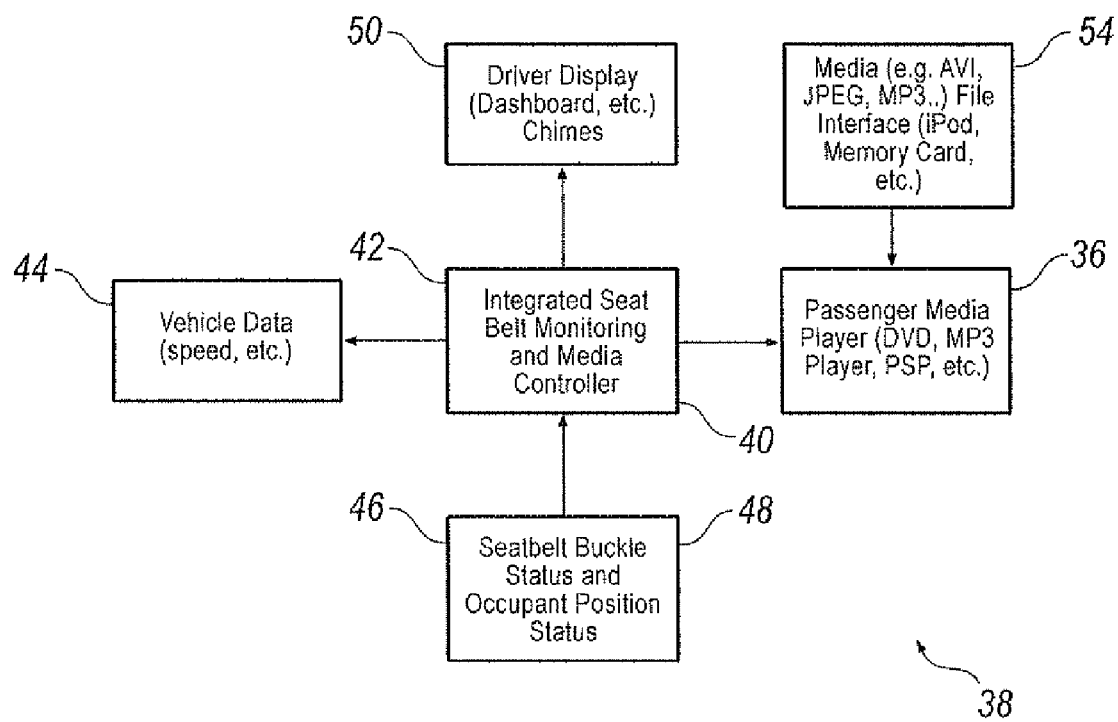
FIG. 2 is a schematic representation of a system in a vehicle with integrated media to monitor vehicle seats and associated seat belts of the present invention.

Turning to FIG. 2, there is depicted a system in a vehicle with integrated media to monitor vehicle seats and associated seat belts. Specifically, system 38 is comprised of integrated seat belt monitoring and media controller 40. The controller has memory 42 for storing data signal input from sensors 44, electronically connected to the controller. The sensors may be vehicle speed sensors to determine the actual vehicle speed of the vehicle, or whether the vehicle is activated i.e. the ignition is on and the vehicle is ready to be driven. In addition, the controller is adapted to receive input from seat sensors 46, which may be seat occupation sensors to determine whether the seat is occupied and determine so physical aspects of the person occupying the seat, their position status etc. In addition, a seat belt buckle sensor 48 is included to send data signals to the controller indicative of whether the seat belt associated with an occupied seat is buckled or unbuckled. Furthermore, the seat belt buckle sensor is useful when the seat is not occupied to determine whether the unoccupied seat is buckled or unbuckled such that the information maybe used by the controller to determine whether the seat and associated seat belt are in a synchronized state, as will hereinafter be described.

The controller is electronically connected to a driver display console 50. The controller sends signals to the console that may activate visual alerts such as a figure or flashing light, and it may further activate an audio signal, such as chimes or a voice indicating the status of the seats and associated seat belts. The controller is further electronically connected to a passenger media player or integrated media player 36 that may be a DVD player, and MP3 player, PSP player, etc. As is customary with such devices, media interface devices 54, such as AVI, JPEG, MP3 and/or file interface devices such as, for example iPods, Memory Cards, etc. These or any other suitable devices may be used as interfaces with the passenger media of the present invention.

Figure 3:
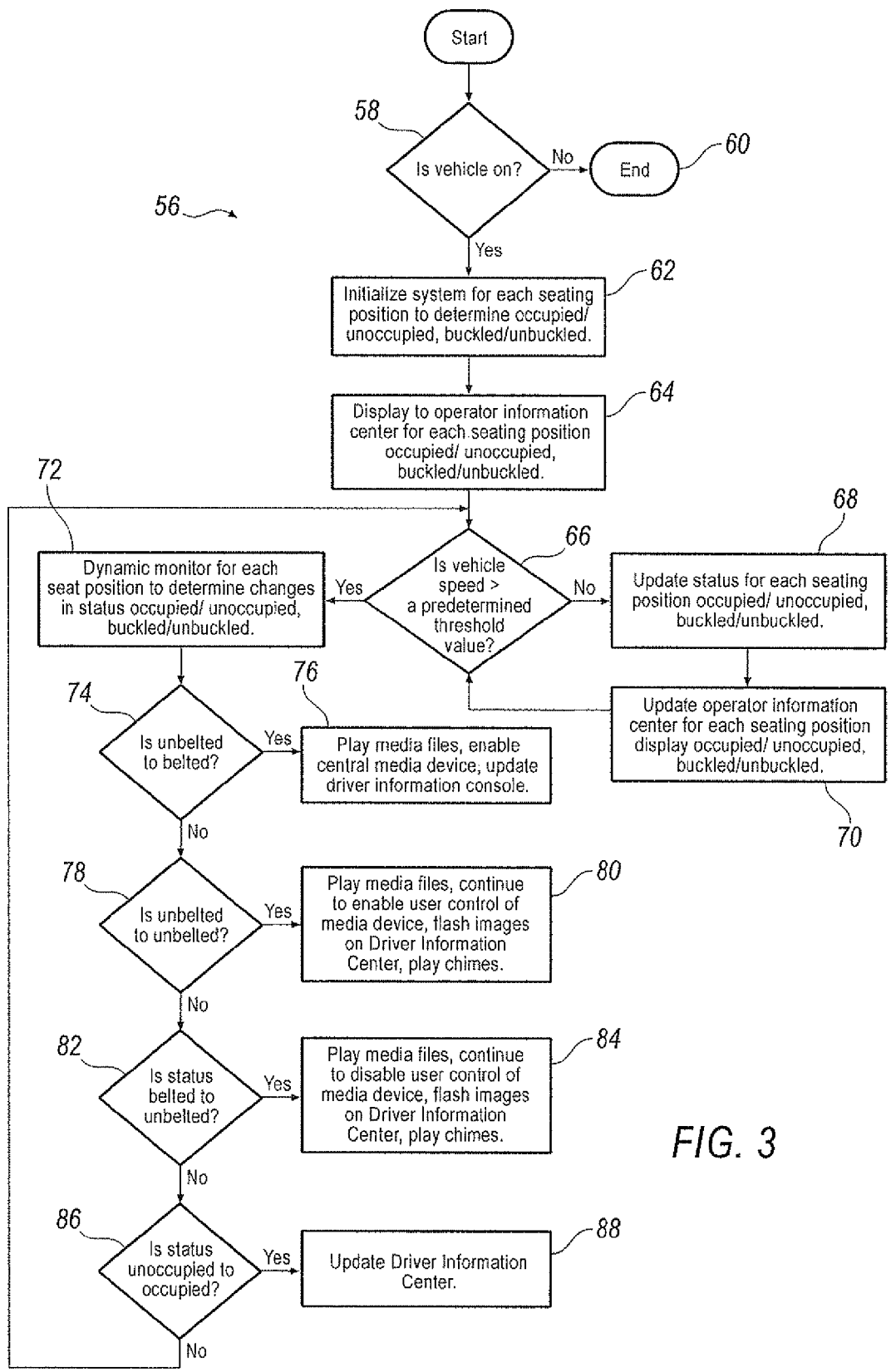
FIG. 3 is a representation of a software flowchart of one embodiment of the present invention.

Turning now to FIG. 3, there is depicted a representation of a software flow diagram of one method 56 according to the present invention. Step 58 is determining whether the vehicle is activated. In this regard, it is contemplated that the ignition is "on", or the vehicle is otherwise in a state wherein it is running but not yet moving. If the vehicle is not on, the software ends at step 60. If the vehicle is "on", step 62 is initializing the system for each seating position to determine whether each seat is occupied, or unoccupied, and the associated seat belt is buckled or unbuckled. Step 64 is display the status information regarding seat occupancy (occupied or unoccupied) and status of seat belt information (buckled or unbuckled) for each seat and display that information at the driver console. Thus, the operator of the vehicle is alerted to the status of the seats and associated seat belt before the vehicle begins to move. Step 66 is determining whether the vehicle speed is greater than a predetermined threshold value. If no, then step 68 is to update the status for each seating position as to whether it is occupied or unoccupied and the status of the associated seat belts, i.e, buckled or unbuckled. Step 70 is to update the driver display console for each seating position regarding seat occupancy and state of seat belt use. The software then loops back to step 66.

If the answer to the inquiry at step 66 is yes, then step 72 is dynamically monitoring each seat position to determine changes in status from occupied to unoccupied, or vice versa, and buckled or unbuckled, or vice versa. Step 74 is a determination that the seat is occupied and the associated seat belt is buckled. Once the seat belt and seat are in a synchronous state, step 76 is enable control of the media device, permit playing of media files, enable control of media device and update the driver display console. Similarly, at step 78, if the seat is unoccupied and the seat belt is unbuckled, step 80 is to enable control of the media device, permit playing of media files, enable control of media device and update the driver display console. At step 82, if the determination is the seat belt status changed from belted to unbelted, step 84 is play media files, continue to disable user control of media devices, flash visual and/or audio warning alerts on the driver console panel. Similarly, step 86 if it is determined that the status of the seat changes from unoccupied to occupied, step 88 is to update the driver display console. If the status did not change from occupied to unoccupied, the software loops back to step 66.

In one preferred embodiment, the method utilizes the vehicle speed, occupant presence and seat belt buckle switches to determine which seating positions are occupied, have buckled seat belts and if the vehicle is moving above a specified threshold speed (e.g. 2 MPH).

The integrated restraint and media control system determines under what circumstances a specific image, sound or media is to be played to either the operator or the passengers. For example, if the method has determined that the third row passenger has become unbuckled while the vehicle is moving, the system would notify the operator by displaying a light or an image on the dash and the rear seat occupants by using the medial player on the vehicle to play a stored sound file such as, "third row occupant left side has been unbuckled" and an image or video would be displayed on the media system screen illustrating the location of the unbuckled occupant and playing a video demonstrating the proper technique to wear and buckle a seat belt.

The digital media storage and interface is essential for the user to customize the images, videos and sounds played for a given situation detected by the system. For example, the media could be selected to better address a particular age group (i.e. video message or media from a particular celebrity to remind them to buckle their seat belt) or a series of videos or sounds that are played the longer the seat positions are unbelted.

The system could be used as a reward system as well. For example a particular media genre (video player) is only played if the seats are buckled and is disabled if a given occupied seat becomes unbuckled. In another embodiment, a sound is played as a reward when the seat belts are buckled. For example, a pleasing voice saying "good job" could be played when a seat belt is buckled.

The method works by first determining the number, seating position and seat buckle status of the occupants in the vehicle. This is constantly updated, as long as the vehicle is "on". The system then determines whether the vehicle is moving or traveling above a certain speed. If the vehicle is not moving, notification of which occupants are unbelted is provided to the operator via the restraint and media control center (e.g. via lights on the dashboard). Changes in occupant seating position and seat belt status are also reported to the vehicle operator. When the vehicle is moving above a certain threshold, (i.e. 2 mph), the system continues to monitor occupant presences, seat belt buckle status for each seating position. However, the media system is now "controlled" by an integrated restraint/media control system and its operation is influenced by the status of all occupants' seat belt status. Notification of unbelted status can then be directed toward the rear seat occupants via the media system and/or conventional dashboard images and chimes.

The words used are understood to be words of description, not words of limitation. Those skilled in the art recognize that many variations and modifications are possible without departing from the scope and spirit of the invention as set forth in the appended claims.

I claim:

1. A method for monitoring seats and associated seat belt use in a vehicle with a plurality of media devices associated with said seats and controlled by an integrated seat belt monitoring and media controller, comprising:
   determining whether said vehicle is activated;
   initializing said integrated monitoring and media controller for each seat to determine a status of each seat;
   displaying said status of each seat to an operator of said vehicle;
   determining whether said vehicle is exceeding a predetermined threshold speed;
   dynamically monitoring each seat position to determine any changes in status of each seat and associated seat belt;
   respectively enabling play of a selected media device associated with a seat only when said seat and corresponding seat belt are in a synchronized state by said controller.

2. The method of claim 1, wherein said synchronized state occurs when said seat is occupied and said associated seat belt status changes from unbuckled to buckled.

3. The method of claim 1, wherein said synchronized state occurs when a seat is unoccupied and said associated seat belt is unbuckled.

4. The method of claim 1, further including disabling control of said associated selected media device when said seat is occupied and said associated seat belt status changes from buckled to unbuckled.

5. The method of claim 1, further including updating a driver information console as the status of said seat and associated seat belt changes.

6. The method of claim 5, wherein updating said driver console includes visual alerts and audio alerts.

7. A seat and associated seat belt monitoring system for a vehicle with a plurality of media devices associated with vehicle seats, comprising:
   an integrated seat belt monitoring and media controller with a memory for seat and seat belt monitoring and for controlling said media devices;
   at least one sensor electronically connected to said integrated seat belt monitoring and media controller to communicate data signals indicative of vehicle activation, vehicle speed, vehicle seat occupancy and associated seat belt status;
   a driver display electronically connected to said integrated seat belt monitoring and media controller to receive data from said controller to permit audio or visual alerts to be made indicative of the status of said seats and associated seat belts; and
   said seat belt monitoring and media controller respectively enabling play of a selected media device associated with a seat for passenger use only when said seat and associated seat belt are in a synchronized state.

8. The system of claim 7, further including media and file interfaces adapted for use by passengers when said seat and associated seat belt are in a synchronized state.

9. The system of claim 7, wherein said synchronized state occurs when said seat is occupied and said associated seat belt status changes from unbuckled to buckled.

10. The system of claim 7, wherein said synchronized state occurs when a seat is unoccupied and said associated seat belt is unbuckled.

11. The system of claim 7, further including an occupant appropriate specific audio message to reward seat belt usage.

* * * * *